United States Patent [19]

Yamashita et al.

[11] Patent Number: 4,733,332

[45] Date of Patent: Mar. 22, 1988

[54] ILLUMINATING DEVICE

[75] Inventors: Hiroshi Yamashita, Ikeda; Kanenaga Fujii, Kawanishi; Junji Hayakawa, Takatsuki; Toru Komiyama; Shun Koizumi, both of Kawanishi, all of Japan

[73] Assignees: Agency of Industrial Science and Technology; Daikin Industries, Ltd., both of Japan

[21] Appl. No.: 855,068

[22] PCT Filed: Feb. 22, 1985

[86] PCT No.: PCT/JP85/00081

§ 371 Date: Mar. 27, 1986

§ 102(e) Date: Mar. 27, 1986

[51] Int. Cl.[4] ............................................. F21V 7/04
[52] U.S. Cl. .................................... 362/32; 362/253;
362/458; 362/296
[58] Field of Search .............. 362/32, 34, 458, 457,
362/253, 296

[56] References Cited

U.S. PATENT DOCUMENTS

| 4,195,907 | 4/1980 | Zamja et al. ................. 362/32 X |
| 4,245,282 | 1/1981 | Sokol .......................... 362/260 X |
| 4,382,272 | 5/1983 | Quella et al. ................ 362/260 X |
| 4,562,832 | 1/1986 | Wilder et al. ................. 362/32 X |
| 4,637,686 | 1/1987 | Iwamoto et al. ............. 362/32 X |

FOREIGN PATENT DOCUMENTS

| 144450 | 11/1975 | Japan . |
| 65852 | 5/1976 | Japan . |
| 118741 | 9/1976 | Japan . |
| 10702 | 1/1983 | Japan . |

*Primary Examiner*—Larry Jones
*Attorney, Agent, or Firm*—Larson and Taylor

[57] ABSTRACT

This invention provides an illuminating device characterized in that the device comprises a light-transmitting rod for transmitting the light incident on one end thereof toward the otehr end, a diffusion pattern formed on the outer peripheral surface of the rod by adhering a fine powder of high refractive index in the shape of a line extending continuously or discretely axially of the rod, and a transparent protective tube covering the peripheral surface of the rod with a circumferential clearance formed between the rod and the tube, the clearance between the rod and the protective tube being sealed off at opposite ends thereof.

16 Claims, 5 Drawing Figures

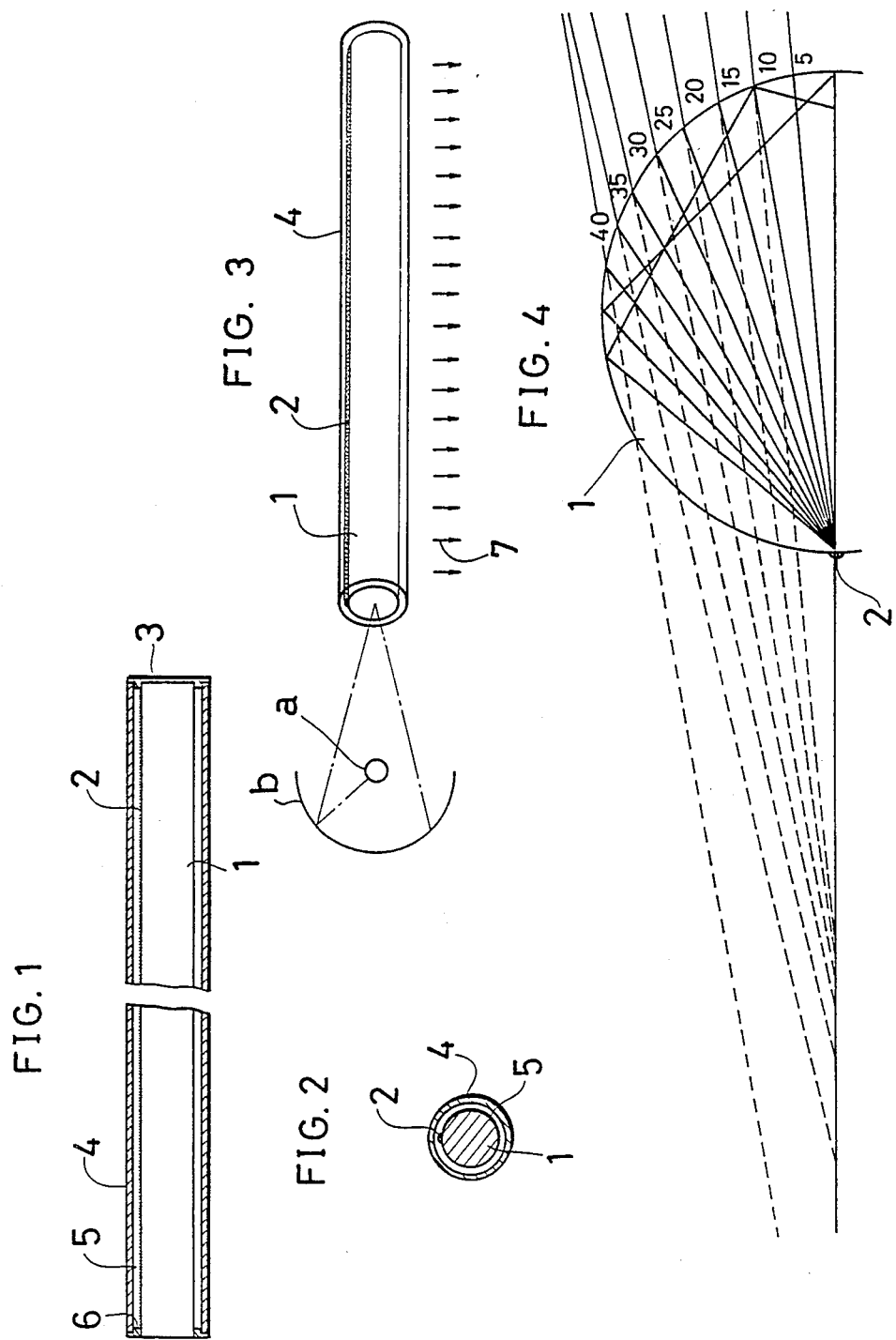

ILLUMINATING DEVICE

TECHNICAL FIELD

The present invention relates to an illuminating device, and more particularly to an illuminating device which is useful for illuminating show windows and showcases and for use as an advertising sign lamp.

BACKGROUND ART

Fluorescent lamps have heretofore been used most widely as illuminating devices. As compared with incandescent lamps, fluorescent lamps generate a considerably lesser amount of heat but nevertheless release a fairly large amount of heat, so that they are not suited to use in a low-temperature atmosphere, for example, in freezing or refrigerating showcases. They have another drawback in that when installed and used at locations exposed to rain as is the case with advertising sign lamps or in places subject to the influence of water as in refrigerating showcases for fresh fish, the lamp is liable to develop electrical troubles such as improper insulation failure and improper illumination. Further when the fluorescent lamp is installed and used in a show window or showcase, there is the likelihood that a light blocking member such as lampshade will be needed to shield the eyes of the customer from the illuminating light, which is inconvenient.

DISCLOSURE OF THE INVENTION

An object of the present invention is to provide an illuminating device which does not generate any heat and which is suited to installation and use in low-temperature atmospheres as in freezing or refrigerating showcases.

Another object of the present invention is to provide an illuminating device which is almost free of the adverse influence of rainwater or water vapor and which is suited to installation in locations exposed to rain as in the case of advertising sign lamps or in places prone to the influence of water as in refrigerating showcases for fresh fish.

Still another object of the present invention is to provide an illuminating device which emits light as directed in a specified direction and which therefore does not require the provision of a lampshade or like light blocking member.

Other features of the present invention will become apparent from the following description.

The present invention provides an illuminating device which is characterized in that the device comprises a light-transmitting rod for transmitting the light incident on one end thereof toward the other end, a diffusion pattern formed on the outer peripheral surface of the rod by adhering a fine powder of high refractive index in the shape of a line extending continuously or discretely axially of the rod, and a transparent protective tube covering the peripheral surface of the rod with a circumferential clearance formed between the rod and the tube, the clearance between the rod and the protective tube being sealed off at opposite ends thereof.

The light-transmitting rod for the illuminating device of the present invention is not limited particularly insofar as it is capable of transmitting light therethrough. Examples of suitable rods are a quartz glass rod (refractive index: 1.46), optical glass rod (refractive index: 1.5 to 1.7), silicone resin rod (refractive index: 1.41) and the like. These rods have a high transparency and involve reduced transmission losses, while they are resistant to light and therefore retain the desired quality and properties over a prolonged period of time. The rod must be solid and circular in cross section. The axis of the rod may be straight or curved. The diameter of the rod is suitably determined according to the amount of light to be transmitted, the length of the illuminating line, etc. For example, it is suitably determined from within the range of about 3 to 30 mm, more advantageously within the range of about 5 to 20 mm. If the diameter is smaller than 3 mm, a sufficient light receiving area will not be available at the incidence end, and a sufficient amount of light will not be obtained. On the other hand, even if the diameter exceeds 30 mm, it is impossible to expect improvements in quality and performance in corresponding relation to the increased cost. Thus, the smaller or larger diameters are not desirable.

A diffusion pattern for reflecting and diffusing the transmitted light through the rod is formed on the outer peripheral surface of the light-transmitting rod by adhesion. The diffusion pattern is formed from a light-resistant transparent fine powder having a higher refractive index than the rod. Examples of such fine powders which are advantageously usable are those of barium sulfate (refractive index: 1.51), magnesia (refractive index: 1.8), titania (refractive index: 2.6), etc. To give a desired color to the reflected and diffused light when so required, ZnS (bluish green) can be admixed with the fine powder, or $Eu_2O_3$ (red) or $Tb_2O_3$ (green) can be admixed with the powder (e.g. magnesia or titania) by thermal dispersion. The fine powder can be adhered to the rod in the form of a pattern, for example, by adhering the powder with a light-resistant transparent adhesive such as silicone rubber adhesive, or by adhering a formed silicone rubber material having the fine powder dispersed therein with use of a transparent silicone rubber adhesive. Further a fluoroelastomer adhesive, if used as the adhesive, affords improved resistance to light. Since the fluoroelastomer adhesive has a lower bond strength than the silicone rubber adhesive, it is in this case desirable to utilize an anchor effect for adhesion, for example, by roughing the portion of the rod to which the powder is to be adhered or forming minute grooves in this portion. The amount of light to be diffused and reflected is also adjustable according to the kind and extent of such surface roughing treatment.

Examples of useful fluoroelastomers are as follows.
*Vinylidene fluoride-hexafluoropropylene copolymer.
*Vinylidene fluoride-hexafluoropropylene-tetrafluoroethylene copolymer.

The diffusion pattern is in the form of a line or lines extending continuously or discretely axially of the rod. The pattern line is straight, curved, helical or of any desired shape. The illustrated rod has a straight line. Advantageously, the pattern line has a thickness of at least 0.1 mm, because if it is too thin, a transmission loss is likely to result. The thickness is usually about 0.3 to 2.0 mm, preferably about 0.5 to 1 mm. The width of the diffusion pattern line is determined suitably in accordance with the amount of incident light, rod diameter, length (length of the illumination line), etc. Generally speaking, as the width of the pattern line increases, the brightness of the illuminating light per unit illumination line increases, but the illumination line becomes shorter. Conversely, as the width decreases, the length of the illumination line increases, but the brightness of the light per unit length decreases. Accordingly, the width is suitably determined in view of the use, purpose, etc. of the illuminating device. When the pattern line has a definite width, the brightness of the illuminating light decreases exponential functionally with an increase in the distance from the incidence end. The decrease may be compensated for by giving the pattern line a width progressively increasing from the incidence end toward the other end. The decrease can be compensated for to some extent also by providing a reflector portion at the emergence end face of the rod and causing the reflector portion to reflect the transmitted light upon the light reaching the emergence end. While the width of the pattern line varies with the length and diameter of the rod, the amount of incident light, the use, purpose, etc. of the device as already stated, the width is usually 0.5 to 3.0 mm, preferably about 1.5 to 2.5 mm.

The transparent protective tube is provided around the light-transmitting rod to cover its outer periphery, with a circumferential clearance formed therebetween. Each end of the clearance is sealed off by a sealing member, which prevents rainwater, dust and other pollutants from entering the clearance, keeping the rod outer peripheral surface clean forever. The protective tube is useful provided that it is transparent and has resistance to light and suitable mechanical strength. For example, one made of transparent glass or fluorocarbon resin is advantageously usable. The sealing member may be one serviceable as a seal. For example, quartz is advantageously usable, which may be transparent or opaque. The adhesive to be used for adhering the sealing member is not limited particularly, while a silicone rubber adhesive, which is excellent in adhesion and resistance to light, is suitable.

When the illuminating device of the present invention is to be used, the light from a light source, such as halogen lamp, mercury lamp or xenon lamp, is made incident on the incidence end of the rod while being converged by an optical system such as a reflector. The incident light is transmitted through the rod axially thereof while repeatedly undergoing total reflection within the rod. During transmission, the light is diffused and reflected back into the rod by the diffusion pattern on the outer periphery of the rod. Further owing to the action of the rod serving as a lens, the light is released as oriented in a direction opposite to the diffusion pattern to serve the function of illuminating light.

The illuminating device of the present invention is so constructed that light is transmitted through the rod axially thereof and, during the transmission, is diffused and reflected by the pattern and also released in a direction opposite thereto to function as illuminating light. Accordingly, the device develops substantially no heat and is in no way adversely affected by rainwater or water vapor. Further because the light is released with directivity by the lens action of the rod, there is no need to provide a light blocking member such as a lampshade.

BRIEF DESCRIPTION OF THE DRAWINGS

FIG. 1 is a view in central longitudinal section showing an embodiment of the invention;

FIG. 2 is a view in cross section of the same;

FIG. 3 is a diagram for illustrating the principle of the illuminating device of the invention;

FIG. 4 is a diagram for illustrating the principle of the lens action of a rod.

BEST MODE OF CARRYING OUT THE INVENTION

Figure 5:
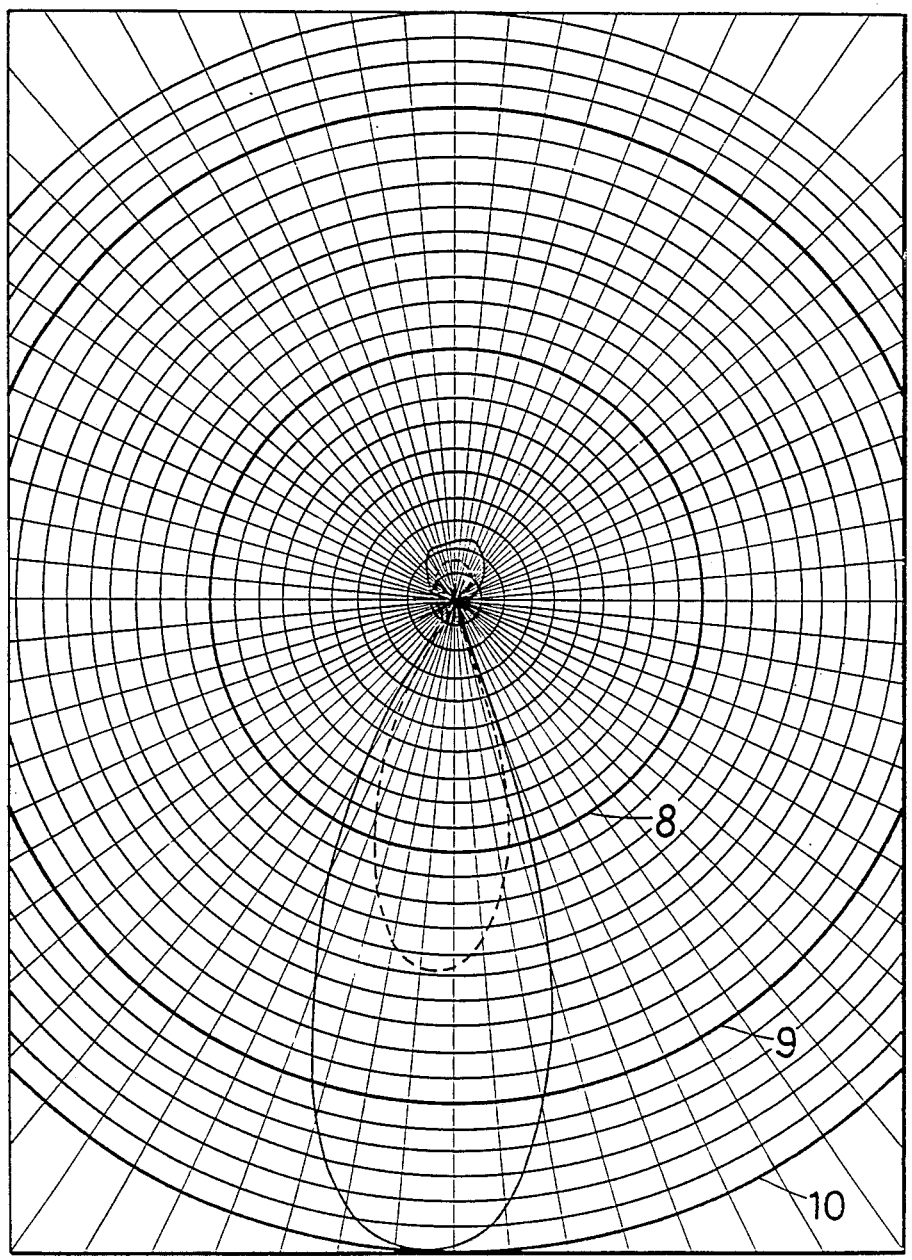
FIG. 5 is a diagram showing in circular coordinate system the results obtained by measuring the axial brightness distribution of the rod and the directivity thereof.

An embodiment of the present invention will be described below with reference to the accompanying drawings.

Referring to the preferred embodiment of the invention shown in FIGS. 1 and 2, a light-transmitting rod 1 in the center is formed with a diffusion pattern 2 in the form of a straight line along its axis and has a reflector portion 3 at its emergence end. The outer periphery of the rod 1 is covered with a transparent protective tube 4, with a circumferential clearance 5 formed therebetween. Each end of the clearance 5 is sealed off by a sealing member 6 serving also as a spacer. The sealing member 6 prevents rainwater, dust and the like from entering the clearance 5 to keep the outer peripheral surface of the rod 1 clean forever.

FIG. 3 is a diagram for illustrating the principle of the illuminating device of the present invention. The light from a light source a strikes the incidence end of the rod 1 while being converged by a refector b, whereupon the incident light is transmitted through the rod 1 toward the emergence end axially thereof while being totally reflected within the rod. During the transmission, the light is diffused and reflected back into the rod 1 by the diffusion pattern 2. Further by virtue of the action of the rod 1 serving as a lens, the light is emitted as oriented in a direction opposite to the pattern 2, as indicated by arrows 7 illustrated. When the light from the light source a is directly received by the incidence end of the rod 1 as illustrated, the incidence end portion may develop heat, but the heat is very slight and negligible. To prevent the heat development at the incidence end, it is possible to render the light incident on the rod end via a known light-transmitting line.

FIG. 4 is a diagram for illustrating the principle of the lens action of the rod 1 which is made of transparent quartz (refractive index: 1.46). Of the rays diffused and reflected by the diffusion pattern 2, those within an angle of diffusion of about ±40° are emitted from the rod at a reduced angle in a direction opposite to the pattern 2 by virtue of the lens action of the rod to serve as illuminating light. The rays diffused at angles larger than ±40° will be repeatedly totally reflected within the rod 1, further diffused and reflected by the pattern 2 again, and released from the rod 1.

Thus, while being transmitted through the rod 1, the light is diffused and reflected along its line and also released from the rod as oriented in a direction opposite to the pattern to function as illuminating light.

FIG. 5 shows a circular coordinate system illustrating the brightness distribution of the illuminating light (light emitted by the rod) in the axial direction of a rod 1 and the directivity of the light, as determined under the following conditions.

Material of rod: Quartz glass
Diameter of rod: 10 mm
Length of rod: 2 m
Material of diffusion pattern: Fine powder of titania
Width of diffusion pattern: 2 mm (uniform)
Adhesive: Silicone rubber adhesive
Light source: Halogen lamp (50 W)
Angle of convergence of light from light source: 30°

With reference to FIG. 5, the solid line represents the measurements at a distance of 10 cm from the incidence end, and the broken line the measurements at a distance of 170 cm from the same. In the diagram, indicated at 8 is 150-lux line, at 9 300-lux line and at 10 400-lux line. As measured at a distance of 10 cm from the rod, the solid line indicates a maximum brightness of about 400 luxes, and the broken line indicates a maximum of about 225 luxes. The brightness is about 56% lower at the distance of 170 cm from the incidence end than at 10 cm therefrom.

When a reflector portion 3 is provided at the emergence end, the lower brightness value increased to about 340 luxes, hence an increase of about 50%. The directivity was about ±20° at the former and latter positions. This reveals that the light reflected from the diffusion pattern 2 is made directional by the lens action of the rod.

Thus, while being transmitted through the rod, light is diffused and reflected by the diffusion pattern to serve as illuminating light, so that the illuminating device of the present invention develops substantially no heat, requires no consideration for electric wiring and electrical insulation and is almost free of the adverse effect of rainwater or water vapor. Because the light emitted is directional owing to the lens action of the rod, the present device need not be provided with a lampshade or like light blocking member heretofore used. With these features, the present device is very useful for show windows, showcases (especially freezing or refrigerating showcases), various advertising sign lamps, etc.

While FIG. 3 shows that the light from the light source is directly incident on the pesent device, the device may alternatively be adapted to receive light via a light-transmitting member, such as the one disclosed in Unexamined Japanese Patent Publication SHO 59-166901 and various other known light-transmitting members. Further the illuminating device may include an intermediate connecting means. A heat-shrinkable, light-resistant, transparent tube can be provided around the protective tube 4 as the connecting means.

What is claimed:

1. An illuminating device characterized in that the device comprises:
    a light-transmitting rod for transmitting the light incident on one end thereof toward the other end,
    a light-impervious diffusion pattern which is formed on the outer peripheral surface of the rod in the shape of a discrete line extending continuously or discretely axially of the rod and which is capable of diffusing and reflecting the transmitted light incident thereon back through the rod and out an opposite side of the rod in a directional projection, said diffusion pattern comprising a fine powder of high refractive index and an adhesive, and
    a transparent protective tube covering the peripheral surface of the rod with a circumferential clearance formed between the rod and the tube, the clearance between the rod and the protective tube being sealed off at opposite ends thereof.

2. An illuminating device as defined in claim 1 and characterized in that a reflector portion is provided at the emergence end of the light-transmitting rod.

3. An illuminating device as defined in claim 1 and characterized in that the light-transmitting rod is one selected from among a quartz glass rod, silicone resin rod and optical glass rod.

4. An illuminating device as defined in claim 1 and characterized in that the light-transmitting rod is 3 to 30 mm in diameter.

5. An illuminating device as defined in claim 4 wherein the diameter of the light transmitting rod is preferably 5 to 20 mm.

6. An illuminating device as defined in claim 1 and characterized in that the diffusion pattern is made of at least one fine powder selected from among barium sulfate, magnesia and titania powders.

7. An illuminating device as defined in claim 1 and characterized in that the fine powder forming the diffusion pattern contains as admixed therewith one of ZnS (bluish green), $Eu_2O_3$ (red) and $TbO_3$ (green) for coloring.

8. An illuminating device as defined in claim 1 and characterized in that the diffusion pattern comprises the fine powder and a light-resistant transparent adhesive in which the fine powder is admixed for adhering the fine powder directly to the rod and the diffusion pattern has a thichness of at least 0.1 mm.

9. An illuminating device as defined in claim 8 and characterized in that the light-resistant transparent adhesive is a silicone rubber adhesive.

10. An illuminating device as defined in claim 8 and characterized in that the light-resistant transparent adhesive is a fluoroelastomer adhesive.

11. An illuminating device as defined in claim 10 and characterized in that the rod surface coated with the adhesive is formed with an anchor portion for adhesion.

12. An illuminating device as defined in claim 1 and characterized in that the diffusion pattern comprises a formed silicone rubber material having the fine powder dispersed therein, and the adhesive is a light-resistant transparent adhesive for adhering the formed material to the rod.

13. An illuminating device as defined in claim 1 and characterized in that the line of the diffusion pattern is 0.5 to 3.0 mm in width.

14. An illuminating device as defined in claim 13 wherein the width of the line of the diffusion pattern is preferably 1.5 to 2.5 mm.

15. An illuminating device as defined in claim 1 and characterized in that the diffusion pattern has a uniform width over the entire length thereof.

16. An illuminating device as defined in claim 1 and characterized in that the diffusion pattern has a width progresssively increasing from the incidence end toward the other end.

* * * * *